United States Patent [19]

Kameda et al.

[11] Patent Number: 5,222,573
[45] Date of Patent: Jun. 29, 1993

[54] CONSTRUCTION OF AN AUTOMOBILE POWER TRAIN

[75] Inventors: Osamu Kameda; Yoshimichi Tanaka, both of Hiroshima; Junichi Okita, Iwakuni; Sakumi Hasetoh, Yamaguchi, all of Japan

[73] Assignee: Mazda Motor Corporation, Hiroshima, Japan

[21] Appl. No.: 853,386

[22] Filed: Mar. 18, 1992

[30] Foreign Application Priority Data

Mar. 25, 1991 [JP] Japan .................................. 3-060526

[51] Int. Cl.⁵ .............................................. B60K 17/22
[52] U.S. Cl. ..................... 180/297; 180/147; 180/233
[58] Field of Search ............... 180/291, 297, 234, 233, 180/309, 79.3, 79.1, 147, 148

[56] References Cited

U.S. PATENT DOCUMENTS 5,129,476 7/1992 Kikuchi et al. ..................... 180/297

FOREIGN PATENT DOCUMENTS 6119936 11/1981 Japan .
1-316560 12/1990 Japan .

Primary Examiner—Richard M. Camby
Attorney, Agent, or Firm—Keck, Mahin & Cate

[57] ABSTRACT

An automobile powertrain has an engine disposed in an engine room and oriented so that its a crankshaft is directed transversely. A transmission is placed in the engine room behind the engine and has an output shaft directed parallel to the crankshaft. A propeller shaft extends in a lengthwise direction of the vehicle body, and a power coupling gear train operationally couples the output shaft of the transmission to the propeller shaft. The axis of rotation of the crankshaft is positioned in front of the center axes of the front axles, and the power coupling gear train is positioned above a steering rack and/or a cross member by which the steering rack is supported.

13 Claims, 3 Drawing Sheets

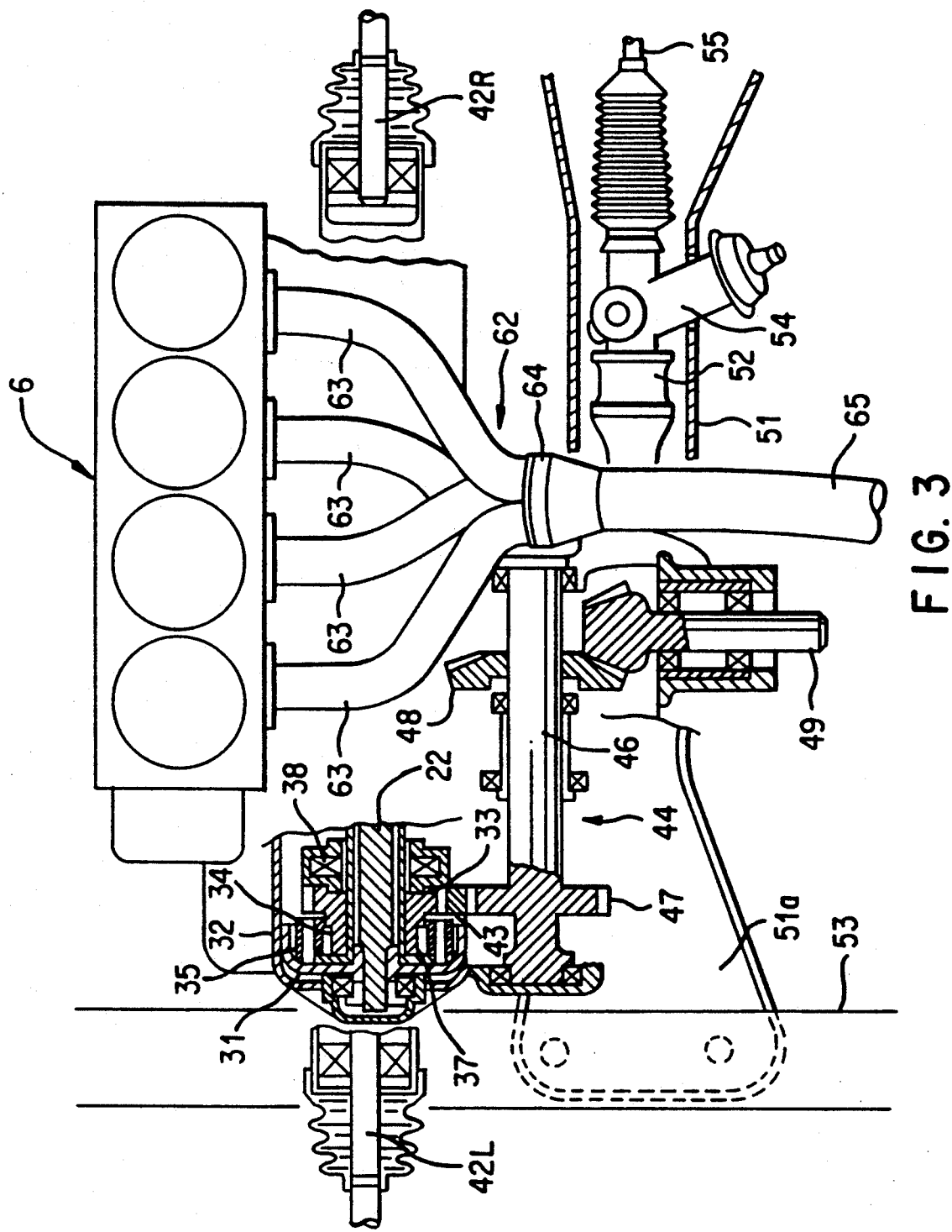

CONSTRUCTION OF AN AUTOMOBILE POWER TRAIN

BACKGROUND OF THE INVENTION

1. Field of the Invention

This invention is concerned with the construction of a powertrain for an automobile of a type having an engine and a transmission which are transversely disposed and arranged one behind the other.

2. Description of Related Art

Typically, in automotive vehicles such as four wheel drive vehicles and front engine-front drive (FF) vehicles, the design of a powertrain primarily depends upon whether an engine and a transmission are mounted transversely or lengthwise in an engine room of the vehicle body. In a transversely mounted powertrain arrangement, if both an engine and a transmission are aligned, i.e., mounted in line, the overall length of the entire powertrain becomes large and the powertrain is not practical. Because of this, some powertrains have a formation in which a transmission is positioned behind an engine and a power transmitting means, such as a gear train and a chain, is used to operationally couple the engine and the transmission to each other. Such a powertrain has already been developed and is practically in use. Japanese patent application No. 63-146,128, entitled "Power Transmitting Apparatus," filed on Jun. 14, 1988 and laid open to the public as Japanese Unexamined Patent Publication No. 1-316560 on Dec. 12, 1990, discloses one such powertrain.

In what is referred to as a "parallel transverse" powertrain formation, a transmission is located behind an engine in a lengthwise direction of the vehicle body, and a steering rack or a cross member typically occupies a position behind the transmission. The vertical positional relationship between the steering rack or the cross member and a power output component of a propeller shaft, through which a driving force is transmitted to rear wheels from the transmission, importantly influences the ability to make the propeller shaft straight as well as how easy it is to assemble the powertrain to the automotive vehicle. In other words, when the power output component of the propeller shaft is disposed below the steering linkage or the cross member, the power output component is unavoidably positioned close to the ground. In order to ensure that the propeller shaft has adequate ground clearance, it is necessary to divide the propeller shaft into a plurality of portions and connect them such that they are bent up and down. In addition, when assembling an entire powertrain, structured as a single unit, into the engine room from the front of or above the vehicle body, obstructions between the power output component of the propeller shaft of the powertrain unit and either a steering rack or a cross member of the body of the vehicle may occur. Such obstructions may hinder assembly.

SUMMARY OF THE INVENTION

It is one object of the present invention to provide a transverse powertrain which has an appropriate vertical positional relationship between a steering rack or cross member and a power coupling component of a propeller shaft.

It is another object of the present invention to provide a transverse powertrain which allows a propeller shaft to be straightly aligned and the powertrain to be easily assembled to a vehicle body.

These objects of the present invention are accomplished by providing a unique powertrain arrangement. The powertrain has at least an engine and a transmission, both of which are placed transversely in an engine compartment of an automotive vehicle. The engine is disposed so that a center axis of rotation of its crankshaft is positioned forward of center axes of rotation of the front axles. The transmission is disposed so that its output shaft is placed above the front axle rotational axes. A propeller shaft extends in a straight line in a lengthwise direction of the vehicle body and transmits an output for the transmission to rear vehicle axles. A power coupling means, operationally coupling an output shaft of the transmission to the propeller shaft, is positioned above a steering rack. The steering rack is positioned below center axes of rotation of the front axles and/or a cross member secured to side frames of the engine compartment.

If the powertrain is installed in a four wheel drive vehicle, a center differential is disposed so as to place its center axis of rotation so that it is aligned coaxially with the output shaft of the transmission.

According to the powertrain structure of the present invention, the power coupling means, such as a gear train, constitutes the power input component of the propeller shaft. The power coupling means is placed above the steering rack and the hollow cross member. Additionally, the steering rack, the hollow cross member and the power coupling means are arranged directly behind the transmission, which is integrally combined with the front differential as a single unit. The propeller shaft can be arranged so as to extend in a straight line towards the rear differential for the rear wheels, without being bent up or down, but with a proper ground clearance. Consequently, power transmission loss through the propeller shaft is reduced and vibrations of the vehicle body are suppressed.

Moreover, the integral structure of the present invention, in which the steering rack is arranged within the closed hollow cross member and the housing of the steering rack is secured to the hollow cross member, requires a decreased space and provides mutual reinforcement and high rigidity between the steering rack and the closed hollow cross member.

Gears of the power coupling gear train on the powertrain side are positioned only above the cross member while assembling the unitized powertrain and do not interfere with the cross member, the transmission and other components of the powertrain, including the engine, in the engine room at the front of the vehicle body. As a result, assembly of the powertrain can be accomplished easily and without encountering any obstacles.

The input and output shafts of the transmission are separate from and placed above the front axles for the front wheels. The input and output shafts also are coaxially aligned with the center axis of rotation of the center differential, so that transmission of the engine output power to the propeller shaft from the center differential, as well as to the center differential from the transmission, is simplified. This enables a simplified powertrain design.

Generally, when a vehicle is slowed down while it is traveling, such as before steering is performed, the vehicle body tends to nose dive. However, in the disclosed embodiment of the present invention, the steering rack is placed below the front axles of the front wheel. Consequently, during a nose dive, the tie rods, which connect the steering rack and the front wheels, tend to be horizontal, so that steering force is smoothly transmitted and improved steering is accomplished.

Furthermore, in the present invention, the exhaust pipe assembly of the engine is arranged to extend from behind the upper part of the engine toward the back of the vehicle body and rearward in a straight line. The exhaust pipe assembly, therefore, is assembled easily in the vehicle body.

BRIEF DESCRIPTION OF THE DRAWINGS

The above and other objects and features of the present invention will be apparent to those skilled in the art from the following description when considered in conjunction with the drawings, in which:

FIG. 3 is a plan view, partly broken away, of FIG. 2.

DESCRIPTION OF THE PREFERRED EMBODIMENT

Figure 1:
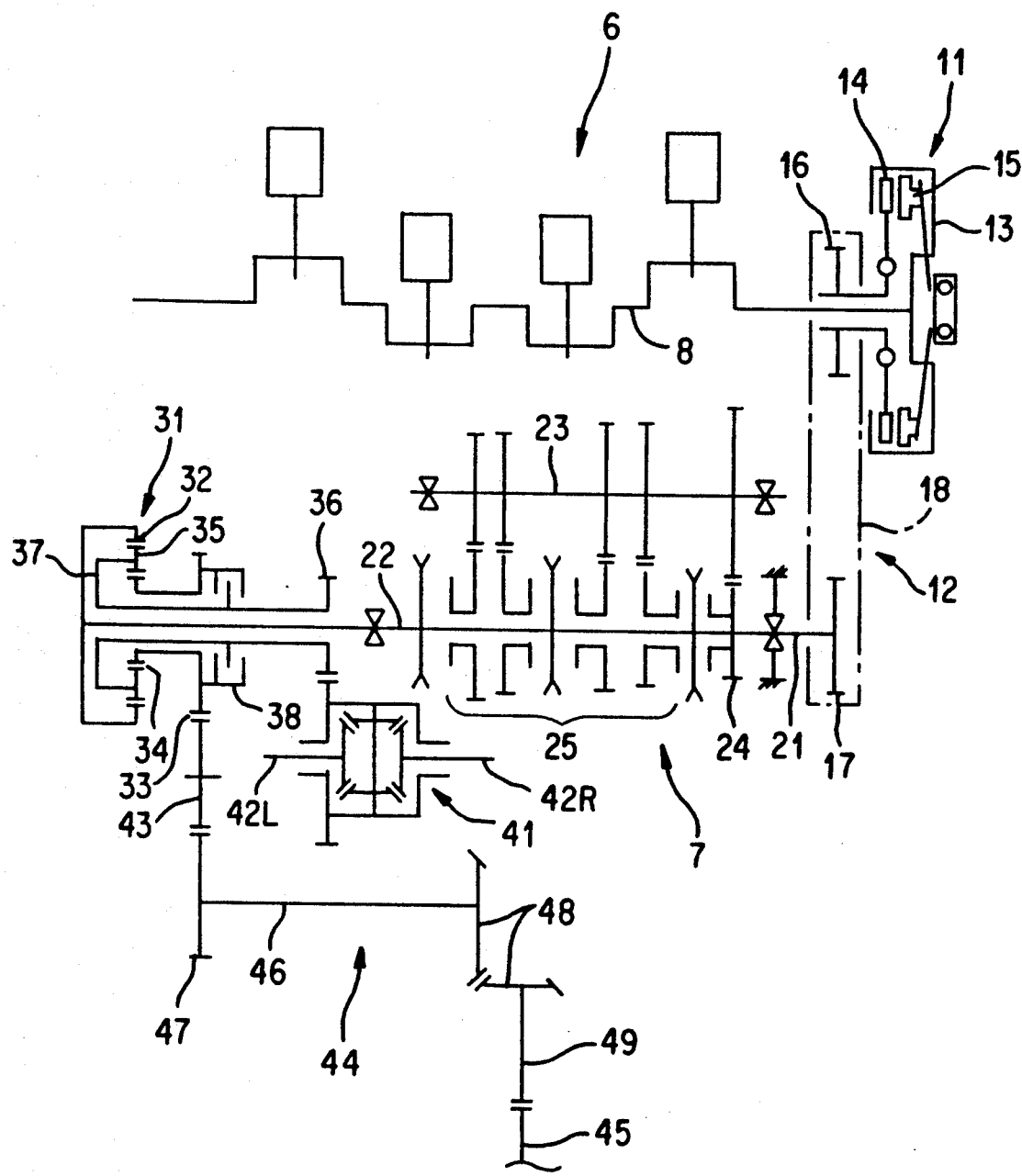
FIG. 1 is a skeleton diagram showing the structure of a powertrain of an automotive vehicle in accordance with a preferred embodiment of the present invention.
Figure 2:
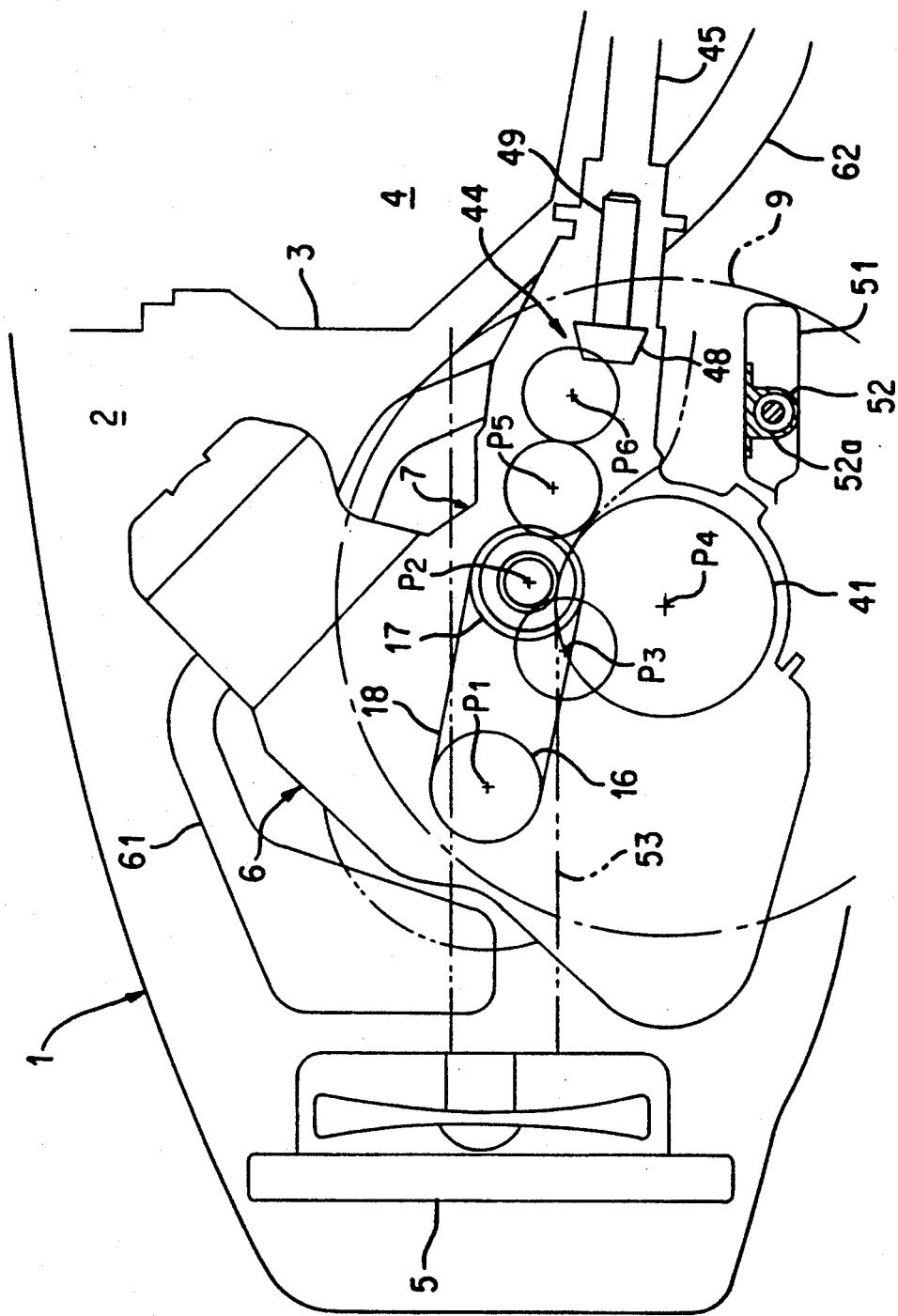
FIG. 2 is a side view showing an arrangement of the powertrain in an engine room of the vehicle body.

Referring now to FIGS. 1 to 3 in detail, a powertrain for a four wheel drive vehicle constructed in accordance with a preferred embodiment of the present invention is shown. In the front part of a vehicle body 1, an engine room or compartment 2 is partitioned from a passenger compartment 4 by a dash panel 3. In this front part of the vehicle body, a radiator 5, a transversely placed engine 6 and a transversely placed transmission 7 are arranged in a lengthwise direction of the vehicle body 1 and in order from front to the back. The engine 6, which may be a four-cylinder reciprocating internal combustion engine, has a crankshaft 8 which is positioned or directed in a transverse direction of the vehicle body. The transmission 7, close behind the transverse engine 6, has input and output shafts 21 and 22 which are coaxially aligned with each other and positioned or directed parallel to the crankshaft 8. The engine 6 and the transmission 7 are operationally coupled to each other through an engine clutch 11 and a power transmission link 12.

The engine clutch 11 is provided at one end of the crankshaft 8 of the engine 6. The clutch 11 includes a support disk 13 fixedly coupled or fastened to the crankshaft 8, a clutch disk 14 closely adjacent the support disk 13, and a pressure disk 15 which forces the clutch disk 14 against the support disk 13. The power transmission link 12, which transmits engine output (i.e., rotation of the crankshaft 8) through the engine clutch 11 to the input shaft 21 of the transmission 7, includes a drive sprocket 16 fixedly coupled or fastened to the clutch disk 14 of the engine clutch 11, a driven sprocket 17 fixedly coupled or fastened to the input shaft 21 of transmission 7, and a chain 18 connecting the drive and driven sprockets 16 and 17 so as to transmit the engine output to the transmission 7 through the engine clutch 11. When the engine clutch 11 is engaged, i.e., when the clutch disk 14 is firmly frictionally engaged with the support disk 13, the engine output of the engine 6 is connected to the input shaft 21 of transmission 7 through the power transmission link 12, causing the input shaft 21 to rotate.

Transmission 7 has a counter shaft 23 in addition to the input shaft 21 and the output shaft 22 coaxially aligned with each other. The counter shaft 23 is positioned parallel to the axes of rotation of the input and output shafts 21 and 22. The input shaft 21 and the counter shaft 23 are operationally connected by a speed reduction gear train 24. A set of shift gears 25 is arranged between the output shaft 22 and the counter shaft 23. The engine output, which is input to the input shaft 21, is transmitted first to the counter shaft 23 through the reduction gear train 24, and then to the output shaft 22 from the counter shaft 23 through one of the shift gears 25, which is manually or automatically selected. An appropriate speed reduction is, therefore, accomplished.

On an extension of the output shaft 22 of the transmission 7, a centered differential 31 is mounted. The centered differential divides the output from the transmission 7 into two parts, one for the front wheels and one for the rear wheels. The center differential 31, which is of a well known planetary gear type, has a ring gear 32 fixedly coupled or fastened to the output shaft 22 of the transmission 7, a sun gear 34 disposed coaxially with the ring gear 32 and fixedly coupled or fastened to a rear wheel output gear 33, a planetary gear 35 meshed with both the ring gear 32 and the sun gear 34, and a carrier 37 carrying the planetary gear 35 and fixedly coupled or fastened to a front wheel output gear 36. The center differential 31 has a differential motion control device 38 on one side thereof. The device 28 may be a viscous coupling 38 and controls the differential motion of the center differential 3 by restricting relative rotation of the sun gear 34 and the carrier 37.

Part of the engine output for the front wheels, after the output has been divided by the center differential 31, is transmitted to a front differential 41. The differential 41 is of a type having bevel gears. The part of the engine output is transmitted from the front wheel output gear 36 and through the front wheel output gear 36 to the front differential 41. There, the engine output, after being further divided into two parts by the front differential 41, is transmitted to the left and right front wheels 9 through front axles 42L and 42R, respectively. On the other hand, part of the engine output for the rear wheels is transmitted to a rear differential (well known and not shown in the drawings for simplicity), located at the back of the vehicle body 1, from the rear wheel output gear 33 through an idle gear 43, a power coupling means, such as a gear train 44, and a propeller shaft 45. Power coupling gear train 44, which constitutes a power output component of the propeller shaft 45, has a gear drive shaft 46, extending in a transverse direction of the vehicle body. Power coupling gear train 44 is formed by gears, namely, an input gear 47, which is fixedly secured or fastened to one end of the gear drive shaft 46 and meshed with the idler gear 43, and a pair of hypoid gears 48, which are fixedly secured or fastened to another end of the gear drive shaft 46, and a connecting shaft 49, coupled to the propeller shaft 45.

Details of an arrangement of the powertrain, including the engine 6, the transmission 7 and their associated components or parts, will be provided with reference to FIG. 2. The engine 6 is placed or mounted transversely in the engine room 2, and has its top portion, i.e., its cylinder head, tilted back at a 45 degree incline with respect to the vehicle body 1. A center axis P2, with which the input and output shafts 21 and 22 of the transmission 7 and the center differential 31 are coaxially aligned, is located behind a center axis of rotation P1 of the crankshaft 8 of the engine 6. A center axis of rotation P3 of the counter shaft 23 of the transmission 7 is established in front of and below the center axis P2 of the input and output shafts 21 and 22. In addition, a center axis P4, with which the front differential 41 and front axles 42L and 42R for the front wheels 9 are aligned, is established approximately right below the center axis P2 of the input and output shafts 21 and 22 and the center differential 41. Furthermore, on a straight line extending rearward from the center axis P2 of the center differential 31, the input shaft 21 and the output shaft 22 of the transmission 7, there are located a center axis of rotation P5 of the idle gear 43 and a center axis of rotation P6 of the power coupling gear train 44, i.e., of the gear drive shaft 46. The propeller shaft 45 extends horizontally rearward from a point slightly below the center axis P6 of the power coupling gear train 44.

As shown in FIGS. 2 and 3, close behind the front differential 41 and the transmission 7, structurally combined into one unit, there is disposed a closed hollow cross member 51 (i.e., a cross member having a closed cross section), which extends transversely across the width of the vehicle body 1. Within the hollow cross member 51, there is arranged a steering rack 52 extending in a lengthwise direction of the cross member. A housing 52a for the steering rack 52 is secured to the inner upper surface of the hollow cross member 51. The hollow cross member 51 is formed with end portions 51a, which are raised upward and extend to left and right side frames 53 (one of which is shown). The side frames 53 extend from the front to the rear of the vehicle body 1. Each raised end portion 51a is bolted or otherwise secured to the side frame 53. The steering rack 52 is connected to a steering wheel (not shown) through a pinion 54 and is moved in the transverse direction when the steering wheel is operated. Left and right ends of the steering rack 52 extend to the outside of the hollow cross member 51 from the respective raised portions 51a of the hollow cross member 51, and are operationally coupled to the front wheels 9 through tie rods 55, respectively. Both the hollow cross member 51 and the steering rack 52 are located below the center axis P4 of the front differential 41 and the front axles 42L and 42R for the front wheels 9. The center axis P6 of the power coupling gear train 44, including a hypoid gear 48 which serves as a power input component of the propeller shaft 45, is located above the hollow cross member 51.

The engine 6 has an air intake pipe assembly or manifold 61 attached to it. The engine 6 also has an exhaust pipe assembly or manifold 62 attached to it. The exhaust pipe assembly or manifold 62 has a plurality of upper exhaust pipes 63 connected to individual exhaust openings (not shown) of the engine 6. All of the upper exhaust pipes 63 are integrally connected together by an integration pipe 54 and are connected to a single downstream exhaust pipe 65, extending along a lengthwise center line of the vehicle body 1 towards the back of the vehicle body 1. The four primary exhaust pipes 63, which are formed to have almost an equal length, incline and extend rearwardly and down behind the transmission 7 so as to reach the downstream exhaust pipe 65.

The engine 6, the transmission 7 and their associated components or parts of the powertrain are mutually interconnected and previously assembled as one subassembly. The powertrain sub-assembly is placed first in the engine compartment 2 from the front of the engine compartment 2, and then is secured to the vehicle body 1. After assembling the powertrain sub-assembly, the radiator 5, which is previously assembled with components forming a front wall of the engine compartment 2, is installed and assembled to the vehicle body 1.

It is to be understood that although a powertrain in accordance with a preferred embodiment has been described as being installed in a four wheel drive automotive vehicle, the construction of a powertrain according to the present invention, in which both an engine and a transmission are transversely arranged, is usable in conjunction with front engine-rear drive automotive vehicles and various other types of automotive vehicles.

It is also to be understood that although a preferred embodiment of the present invention has been described, the invention is not limited to the described embodiment. Various other embodiments and variants which fall within the scope and spirit of the invention are possible, and such other embodiments and variants are intended to be covered by the following claims.

What is claimed is:

1. An arrangement of a powertrain, having at least an engine and a transmission, in an engine compartment of an automotive vehicle, comprising:

an engine placed within the engine compartment, said engine having a crankshaft with an axis for rotation directed in a transverse direction of a vehicle body and positioned forward of front axles of the automotive vehicle within the engine compartment;

a transmission placed within the engine compartment behind the engine, said transmission having an output shaft directed parallel to the crankshaft;

a propeller shaft extending in a straight lien in a lengthwise direction of the vehicle body to rear axles; and power coupling means, operationally coupling the output shaft of the transmission to the propeller shaft, for transmitting an output from the transmission to the propeller shaft and including a center differential with an axis for rotation for dividing an output from the transmission, said power coupling means being positioned above a cross member secured to side frames of the engine compartment which extend in the lengthwise direction on opposite sides of the engine compartment, said power coupling means further including a front differential with an axis for rotation for receiving an output from the center differential and for transmitting said means to the front axles of the automobile, said powertrain being arranged so that (a) the axis of rotation of the front differential is positioned rearward and below the axis of rotation of the crankshaft and (b) the axis of rotation of the center differential is positioned approximately vertically above the axis of rotation of the front differential.

2. An arrangement of a powertrain as recited in claim 1, and further comprising a steering rack, secured to said cross member, extending in the transverse direction between front wheels of the automotive vehicle.

3. An arrangement of a powertrain as recited in claim 2, wherein the steering rack is positioned below a center axis of rotation of the front axles.

4. An arrangement of a powertrain as recited in claim 2, wherein the cross member is a closed hollow cross member within which the steering rack is disposed.

5. An arrangement of a powertrain as recited in claim 4, and further comprising a housing for enclosing the steering rack, the housing being disposed within and secured to the closed hollow cross member.

6. An arrangement of a powertrain as recite in claim 1, and further comprising the center differential dividing an output from the transmission into two components for the front axles and the propeller shaft, the axis of rotation of the center differential being coaxially aligned with the axis of rotation of the output shaft of the transmission.

7. An arrangement of a powertrain as recited in claim 6, wherein the output shaft of the transmission is positioned above the axis of rotation of the front axles.

8. An arrangement of a powertrain as recited in claim 1, and further comprising an exhaust pipe assembly extending from an upper portion of the engine toward a back of the vehicle body.

9. An arrangement of a powertrain, having at least an engine and a transmission, in an engine compartment of an automotive vehicle, comprising:
  an engine placed within the engine compartment, said engine having a crankshaft with an axis for rotation directed in a transverse direction of a vehicle body;
  a transmission placed within the engine compartment behind the engine and in front of a cross member extending in a lengthwise direction of the vehicle body on opposite sides of the engine compartment, said transmission having an output shaft directed parallel to the crankshaft;
  a propeller shaft extending int a straight line in a lengthwise direction of the vehicle body to rear axles of the automotive vehicle; and
  power coupling means, operationally coupling the output shaft of the transmission to the propeller shaft, for transmitting an output from the transmission to the propeller shaft and including a center differential with an axis for rotation for dividing an output from the transmission, wherein a center axis of rotational of the crankshaft is positioned forward of center axes of rotation of front axles of the automotive vehicle, and the power coupling ends is positioned above a cross member secured to side frames of the engine compartment which extend in the lengthwise direction on opposite sides of the engine compartment, said power coupling means further including front differential with an axis for rotation for receiving an output from the center differential and for transmitting same to the front axles of the automobile, said powertrain being arranged so that (a) the axis of rotation of the front differential is positioned rearward and below the axis of rotation of the crankshaft and (b) the axis of rotation of the center differential is positioned approximately vertically above the axis of rotation of the front differential.

10. An arrangement of a powertrain as recited in claim 9, and further comprising said center differential dividing an output from the transmission into two components for the front axles and the propeller shaft, the axis of rotation of the center differential being coaxially aligned with the axis of rotation of the output shaft of the transmission.

11. An arrangement of a powertrain, having at least an engine and a transmission, in an engine compartment of an automotive vehicle, comprising:
  an engine placed within the engine compartment, said engine having a crankshaft directed in a transverse direction of a vehicle body and positioned forward of front axles of the automotive vehicle within the engine compartment;
  a transmission placed within the engine compartment behind the engine, said transmission having an output shaft directed parallel to the crankshaft;
  a propeller shaft extending in a straight line in a lengthwise direction of the vehicle body to rear axles; and
  power coupling means, operationally coupling the output shaft of the transmission to the propeller shaft, for transmitting an out from the transmission to the propeller shaft, said power coupling means being positioned above a cross member secured to side frames of the engine compartment which extend in the lengthwise direction on opposite sides of the engine compartment,
  said powertrain further comprising a steering rack, secured to said ross member, extending in that transverse direction between front wheels of the automotive vehicle, and further comprising a housing for enclosing the steering rack, the housing being disposed within and secured of the closed hollow cross member.

12. An arrangement of a powertrain as recited in claim 11, and further comprising a center differential for dividing an output for the transmission into two components for the front axles and the propeller shaft, a center axis of rotation of the enter differential being coaxially aligned with the output shaft of the transmission.

13. An arrangement of a powertrain as recited in claim 11, wherein the output shaft of the transmission is positioned above center axes of rotation of the front axles.

* * * * *